United States Patent [19]

Izukawa et al.

[11] Patent Number: 4,987,198
[45] Date of Patent: Jan. 22, 1991

[54] THERMOSETTING RESIN COMPOSITION FOR INJECTION MOLDING

[75] Inventors: Tsukuru Izukawa; Shuhei Ikado, both of Yokohama; Toshiyuki Enomoto, Kamakura, all of Japan

[73] Assignee: Mitsui Toatsu Chemicals, Inc., Tokyo, Japan

[21] Appl. No.: 261,633

[22] Filed: Oct. 24, 1988

[51] Int. Cl.$^5$ .................... C08G 8/04; C08G 14/04; C08L 61/14; C08K 5/13
[52] U.S. Cl. ................... 525/491; 525/534; 524/14; 524/449; 524/876; 528/129; 528/142; 528/154
[58] Field of Search ............... 524/14, 449, 876, 491; 525/507, 534; 428/290; 528/129, 142, 154

[56] References Cited

U.S. PATENT DOCUMENTS

| | | |
|---|---|---|
| 3,434,997 | 3/1969 | Schmoll . |
| 3,915,934 | 10/1975 | Edwards et al. ............ 525/534 |
| 3,971,863 | 7/1976 | Calkins . |
| 4,403,066 | 9/1983 | Brode et al. ............ 524/876 |

FOREIGN PATENT DOCUMENTS

| | | |
|---|---|---|
| 0284385 | 9/1988 | European Pat. Off. . |
| 54-013593 | 1/1979 | Japan . |
| 1172131 | 11/1969 | United Kingdom . |
| 1419663 | 12/1975 | United Kingdom . |

Primary Examiner—Merrell C. Cashion, Jr.
Assistant Examiner—Carlos Azpuru
Attorney, Agent, or Firm—Burns, Doane, Swecker & Mathis

[57] ABSTRACT

There is provided thermosetting resin compositions suitable for injection molding compounds having an apparent curing rate of 0.7 and 0.008 cm/sec respectively at 170° C. and 110° C. by a disk cure tester and an apparent activation energy of at least 26 Kcal/mol, by the addition of fluidity modifiers selected from ether compounds having methylene ether type structure, ester compounds having methylene groups connected with carbonyl ether groups and alcohol compounds having methylene groups connected with hydroxyl groups, to phenolic resin, hexamethylenetetramine, fillers and additives.

4 Claims, 2 Drawing Sheets

THERMOSETTING RESIN COMPOSITION FOR INJECTION MOLDING

BACKGROUND OF THE INVENTION

(a) Field of the Invention

This invention relates to a thermosetting resin composition for injection molding which is excellent in moldability under low injection pressure due to good flowability and thermal stability in a cylinder, and reactivity in a mold.

(b) Description of the Prior Art

In the injection molding of thermosetting resin, materials are desired to provide conflicting properties such as depressed reactivity in the cylinder, good flowability and rapid hardening in the mold. Many methods have been proposed to date for improving these properties.

As to phenolic resin compositions additives such as furfural and styrene have been incorporated in order to improve flowability and thermal stability in the cylinder. Their effects, however, are insufficient to enhance flowability. On the other hand, when the amount of addition is increased, these additives are disadvantageous in that hardening in the mold cannot proceed completely and defects are caused on the appearance and properties of molded articles When curing accelerators are added to the above mentioned system, it is also unfavorable that only a small increase in curing rate is obtained in the mold and thermal stability of the system in the cylinder is remarkably damaged.

In addition, Japanese Laid Open Patent No. 18861/1979 discloses a method for incorporating inorganic salt hydrates and conducting cure acceleration by utilizing water generated by the decomposition of these hydrates in the mold. Japanese Laid-Open Patent No. 137294/1978 discloses a method for using usual precured phenolic resin compositions in admixture with at least two ingredients selected from phenolic resin, hardener and fluidity modifier. Any of these methods can not provide satisfactory effects and have not yet been practically employed.

The required properties for these materials are such that flowability is maintained by inhibiting curing reaction at the material temperature of, for example, about 110° C in the cylinder, whereas the curing reaction is not depressed at the material temperature of about 170° C in the mold. Previous proposals have been unsatisfactory in such viewpoint.

SUMMARY OF THE INVENTION

The first object of this invention is to provide a resin composition which is suitable for an injection molding of thermosetting resin. The resin composition maintains its fluidity by inhibiting curing reaction in the temperature region of, for example, about 110° C. whereas the curing reaction is not depressed in the temperature region of about 170° C.

The second object of this invention is to provide a fluidity modifier suitable for preparing the above stated resin composition.

The third object of this invention is to provide an evaluation method suitable for achieving the above objects.

The above mentioned objects of this invention are achieved by providing a thermosetting resin composition for injection molding comprising a phenolic resin, hexamethylene tetramine, a filler, an additive and at least one fluidity modifier selected from an ether compound, ester compound and alcohol compound; having an apparent curing rate of not less than 0.7 cm/sec at 170° C. and not more than 0.008 cm/sec at 110° C. wherein the apparent curing rate is determined by the slope of straight line portion indicating significant change of a curing rate after induction period on a disk cure chart showing variation of fluidity index $\sqrt{S}$ resulting from the change of primary holding time measured by a disk cure tester at a prescribed temperature; and having an apparent activation energy of at least 26 Kcal/mol wherein the apparent activation energy is calculated from an Arrehenius plot of the apparent curing rate.

That is, the material for a usual molding composition containing the phenolic resin, hexamethylenetetramine, filler and additive is used in combination with at least one fluidity modifier selected from the ether compound, ester compound and alcohol compound Thus the phenolic resin composition for injection molding having enhanced flowability and thermal stability in the cylinder and better curability in the mold can be obtained.

DETAILED DESCRIPTION OF THE INVENTION

Figure 1:
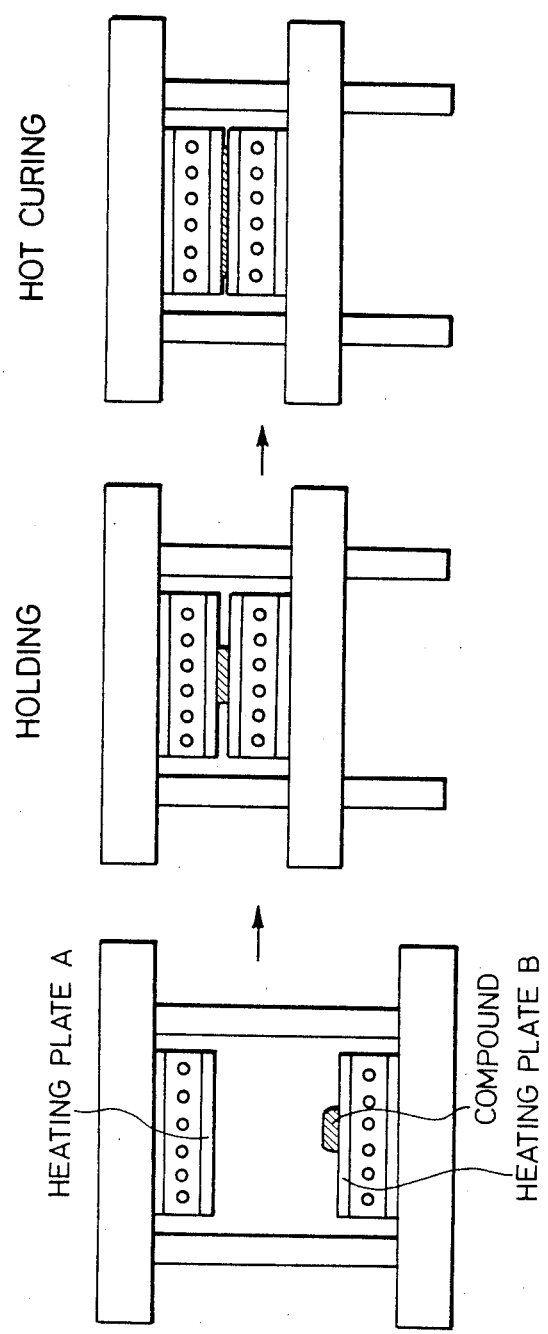
FIG. 1 is a schematic diagram of measuring procedures with a disk cure tester.

Any type of phenolic resin which may be cured with hexamethylenetetramine can be used for this invention. The representative phenolic resins include, for example, those obtained by reacting phenols such as phenol, cresol, xylenol, resorcinol, bisphenol-A, p-butylphenol, p-octylphenol, and styrenated phenol with aldehydes such as formaldehyde, paraformaldehyde, trioxane and furfural; and phenol aralkyl resins derived from phenols and p-xylylene-dihalides such as ',$\alpha$'-dichloro-p-xylene or p-xylylenedialkyl ethers such as $\alpha,\alpha'$-dimethoxy-p-xylene. These pheoolic resins may be used singly or in combination of two or more.

The fillers which may be used for usual phenolic resin compositions can also be used in this invention. Examples of fillers include wood flour, talc, silica, clay, wollastonite, sepiolite, calcium carbonate magnesium oxide, potassium titanate, glass fiber, Vinylone TM fiber Aramid TM fiber, carbon fiber, graphite and carbon black The additives which may be used for usual phenolic resin compositions can also be used in this invention. Examples of additives include pigments, lubricants, antioxidants, curing accelerators, synthetic resins such as epoxy resin and silane coupling agents.

The fluidity modifier used in this invention is at least one compound selected from ether compound, ester compound and alcohol compound The preferred ether compound contains methylene ether type structure in the molecule and includes, for example, $\alpha,\alpha'$ dimethoxy-p-xylene, diethylene glycol n-butyl ether, ethylene glycol di-n-butyl ether and p-dimethoxyether compounds. The preferred ester compound contains methylene groups connecting with carbonyl ether groups and includes, for example, benzyl acetate and dimethyl phthalate. The preferred alcohol compound contains methylene groups bonded to hydroxyl groups and includes, for example, p-xylene glycol.

The amount of hexamethylenetetramine used in this invention is usually 8-25 parts by weight and preferably 8-15 parts by weight per 100 parts by weight of the phenolic resin. The above mentioned filler is usually used in an amount of 60-240 parts by weight per 100 parts by weight of the phenolic resin. The additive is used similarly in the range of 3-15 parts by weight. The amount of the filler less than 60 parts by weight is unfavorable because problems such as tendency for blistering of molded articles are caused in the molding process. On the other hand, the amount of the filler exceeding 240 parts by weight is also disadvantageous because the viscosity of the plasticized composition in the cylinder becomes too high and injection itself leads to be difficult.

The amount of the fluidity modifier used in this invention is 2-20 parts by weight and preferably 3-15 parts by weight per 100 parts by weight of the phenolic resin. When the amount is less than 2 parts by weight, fluidity and thermal stability of the plasticized compound in the cylinder is scarcely improved and the apparent curing rate at 110° C. exceeds 0.008 cm/sec. When the amount exceeds 20 parts by weight, the apparent curing rate at 170° C. decreases to less than 0.7 cm/sec and gives adverse effects on the appearance and quality of the molded articles.

In the preparation of the resin composition of this invention, the mixture of the above phenolic resin, hexamethylenetetramine, filler and additive is not converted to the B-stage by hot kneading prior to the addition of the fluidity modifier.

In the preparation of the resin composition of this invention, a mixture is prepared from the above phenolic resin, hexamethylenetetramine, filler, additive and at least one fluidity modifier selected from the ether compound, ester compound and alcohol compound. Subsequently, the mixture is subjected to preliminary curing by wet or dry kneading with rolls, a kneader or the like.

Following conditions are used in the precuring by the roll method which is frequently carried out in dry kneading. The front roll temperature is 90°-100° C. The rear roll temperature is about 50°-70° C. when the filler is primarily composed of inorganic substances and about 120°-140° C. when wood flour is a principal ingredient of the filler. Hot kneading time is 2-4 minutes. Molding material can be prepared from the precured sheet by usual method such as the power mill. In the wet kneading method by using the kneader and the like, a wetting agent such as acetone and methanol is used in an amount of 10-100 parts by weight per 100 parts by weight of the phenolic resin. The mixture is hot kneaded at 50°-70° C. for 10-20 minutes and then dried at 70°-90° C. until the wetting agent is removed to give the molding material In any methods mentioned above, the hot kneading conditions are selected so that the B-stage of the precured material is in the range of 12-13 cm of initial fluidity $\sqrt{S}$ when the primary holding time is 0°at 170° C. in the later mentioned disk cure tester.

The resin composition of this invention can convert to a suitable thermosetting resin composition for injection molding by the method mentioned above.

The resin composition of this invention is characterized in that the apparent curing rate measured with the disk cure tester is not less than 0.7 cm/sec at 170° C. and not more than 0.008 cm/sec, and furthermore the apparent activation energy calculated from the Arrehenius plot of the apparent curing rate is at least 26 Kcal/mol.

Figure 2:
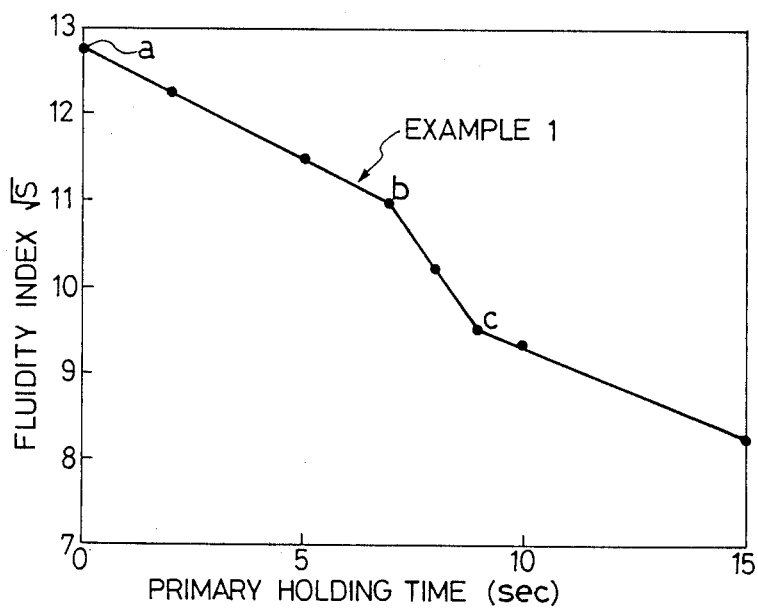
FIG. 2 is a diagram illustrating relationships between primary holding time and fluidity index $\sqrt{S}$ in Example 1.

The disk cure tester will be described below. The tester is a Model WFA-15, manufactured by Shinto Metal Industries Ltd. As illustrated in FIG. 1, 3 g of the compound is placed on a heating plate B maintained at a prescribed temperature. The heating plate B is quickly raised to the position having a spacing of 1 mm to the heating plate A. Both heating plates are held at the position for a predetermined time (referred to as primary holding time). After finishing the primary holding time, the heating plate B is further raised. The compound is pressed at the pressure of 83 kg/cm² generated between the both heating plates and cured for a prescribed time. The square root of the area (S) (fluidity index $\sqrt{S}$) of the cured material thus obtained is determined. Thus, for example, variation of fluidity index $\sqrt{S}$ caused by the change of primary holding time at a prescribed temperature of 170° C. is illustrated in the disk cure chart of FIG. 2. As shown in FIG. 2, the curing rate is remarkably changed after the induction period of the chart (from point a to point b in the chart) The apparent curing rate (cm/sec) can be obtained from the slope of straight line portion (from point b to point c in the chart)

Figure 3:
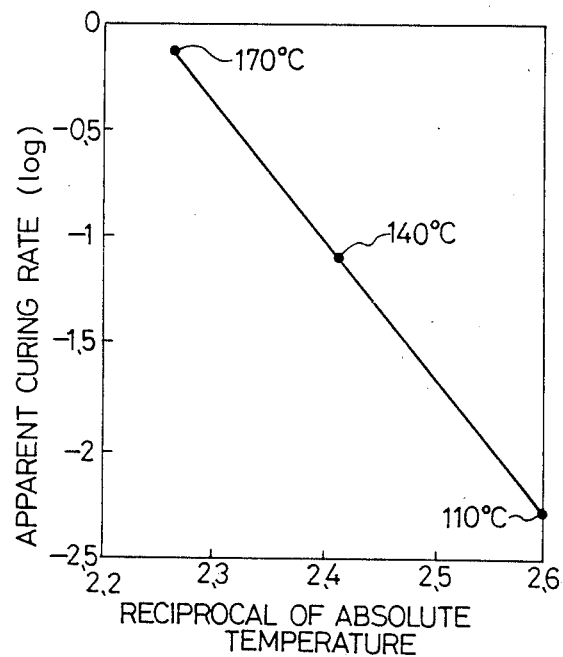
FIG. 3 is an Arrehenius plot of Example 1.

The apparent activation energy can be calculated from the Arrehenius plot (FIG. 3) of the apparent curing rate obtained at arbitrary temperatures from 110° C. to 170° C. The following report can be used as a reference to the calculation method of the activation energy.

S. Tonogaya, New Methods for Evaluating the Flow and Curing Characteristics of Thermosetting Resins and their Applications to Molding Practice Technical Report of Osaka City Industrial Research Institute (1983).

The resin composition of this invention having a specified apparent curing rate at 170° C. and 110° C. as well as a specified apparent activation energy as mentioned above have solved the problem on the temperature dependence of curing rate which could not be resolved by previous proposals. The problem has been solved by the simultaneous use of the fluidity modifier For example, an injection molding machine for the thermosetting resin is set at a front and rear temperature of 95° C. in the cylinder, injection pressure of 410 kg/cm² and mold temperature of 170° C. Under these conditions, the resin composition of this invention can be injection molded within the injection time (mold filling time) which is set at less than 15 seconds, even though residence time of the resin composition in the cylinder exceeds 4 minutes Such evaluation method using the injection molding machine for the thermosetting resin which is set at the front and rear temperature of 95° C. in the cylinder 25 or at the injection pressure of 410 kg/cm² could not be applied to the previously known phenolic compounds. The resin composition has also better curability than conventional compounds at a high-temperature region of about 170° C. and thus causes no problem on the curing time in the mold.

Another characteristic of the resin composition of this invention is a high spiral flow length of more than 20 cm in the transfer molding method at 170° C., which means a good fluidity of the resin composition at high temperatures. The spiral flow length of more than 20 cm also be achieved by prior art, for example, by the addition of furfural as a fluidity modifier. Furfural, however, must be added in a large amount in order to provide similar fluidity as compared to the fluidity modifier of this invention. As a result, furfural causes poor workability in the production step of the composition, particularly in the precuring step and also to low curability in the molding step, thereby leading to a disadvantage of giving adverse effects on the quality of molded articles. These problems are resulted from insufficient temperature dependence of the curing rate in both low and high temperature regions. It is thus understood the requirement of this invention that the apparent activation energy of at least 26 Kcal/mol is needed on the basis of the results of measurement by the disk cure tester.

The injection molding compound obtained by using the resin composition of this invention has good fluidity and moldability under low pressure and enables, for example, enlarging of projected area in the mold, increase in injection volume, decrease in injection energy, reduction of residual stress in the molded articles, decrease in the sectional area of gate in the mold and miniaturization of sprues and runners The excellent thermal stability of the molding compound in the cylinder enables improvements of molding methods such as application of molding machine and molding procedures used for the injection molding of thermoplastic resin, utilization of so-called cushion molding and application to flashless molding. Furthermore, by using a screw having high kneading efficiency, the material temperature can be raised in the cylinder and molding cycle time can be decreased. Other miscellaneous effects are also expected.

The injection molding compound prepared from the resin composition of this invention can of course be used for usual high pressure injection molding machines. In the high pressure molding, high fluidity of the compound can reduce mold filling time in precision molding and molding cycle time can be reduced by utilizing exothermic phenomenon of the compound at the gate. The thermal stability of the compound can also improve workability after long residence in the cylinder.

Thus a variety of industrially valuable effects can be obtained by using the injection molding compound of this invention.

This invention will hereinafter be illustrated in detail by way of examples and comparative examples.

EXAMPLES 1-10

Novolac resin (Trade Mark, NOVOLAC #1000 HS and #2000; Products of Mitsui Toatsu Chemicals Inc.) and phenol aralkyl resin (Trade Mark, MILEX XL-225; Product of Mitsui Toatsu Chemicals Inc.) were used as phenolic resin.

The resin compositions consisting of ingredients illustrated in Table 1 were kneaded with 14"hot rolls for 2-4 minutes. The front roll temperature was maintained at 90°-100° C. The rear roll temperature was held at about 60° C. when the fillers were mainly composed of inorganic substances and at about 140° C. when the fillers were primarily composed of wood flour. The kneaded sheet thus obtained was cooled and crushed in a power mill equipped with a 6 mm screen.

The thermosetting resin compositions for injection molding thus obtained were tested their properties. A 50 ton transfer molding machine (Model HDF-50, a product of Hoshino Tokushu Inc. in 1982) was used at a mold temperature of 170° C., filling pressure of 460 kg/cm$^2$ and plunger speed of 40 mm/sec. Spirals were molded. The spiral flow length was determined by measuring the length of glossy portion of the spirals. The amount of sample was 25 g and adjusted so as to obtain a cull thickness of 20 mm. A mold specified in EMII 1-66 was used. Curing time was 2 minutes.

A disk cure tester (Model WFA-15; a product of Shinto Metal Industries Ltd. in 1979) was operated by the above mentioned procedures to obtain a disk cure chart illustrating variation of the fluidity index $\sqrt{S}$ caused by changing the primary holding time.

The apparent curing rate was determined by measuring the slope of straight line portion indicating a remarkable change of the curing rate after the induction period of the curve. The apparent activation energy was calculated from the Arrehenius plot of the apparent curing rate.

An injection molding machine (Model IR 45P, a product of Toshiba Machine Inc. in 1981) having a clamping force of 45 ton was used at a mold temperature of 170° C., front and rear cylinder temperatures of 95° C., and injection pressure of 410 kg/cm$^2$. The thermal stability in the cylinder was indicated by the maximum residence time of the compound in the cylinder which can fill the mold within 15 seconds. The mold used was a JIS model family mold having a cavity volume of 42 cm$^3$ for preparing the specimens of flexural strength, Charpy impact strength and water absorption. The minimum curing time which causes no blister on the specimen for Charpy impact strength was measured every five minutes. The results obtained are summarized in Table 1.

COMPARATIVE EXAMPLE 1-6

Comparative Examples 1-3 were carried out by the same procedures as respectively described in Examples 1, 8 and 10 without using the fluidity modifiers.

Comparative Examples 4 and 5 were carried out by the same procedures as described in Example 1 except that previously used additives, e.g. furfural and styrene were employed in place of $\alpha,\alpha'$-dimethoxy-p-xylene.

Comparative Example 6 were carried out by the same procedures as described in Example 1 except that $\alpha,\alpha'$-dimethoxy-p-xylene and novolac resin were added to the pre-cured phenolic compound in accordance with the procedures disclosed in Japanese Laid-Open Patent No. 137294/1978.

The properties of these thermosetting resin compositions for injection molding were measured. The results of spiral flow length, apparent curing rate and apparent activation energy at 110° C. and 170° C., thermal stability in the cylinder and curing time are summarized in Table 1.

TABLE 1

| Example and Comparative Example | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| NOVOLAK #1000HS | | | | | | | | | 25 |
| NOVOLAC #2000 | 100 | 100 | 100 | 100 | 100 | 100 | 100 | | |
| MILEX XL-225 | | | | | | | | 100 | 75 |
| Hexamethylenetetramine | 12 | 12 | 12 | 12 | 12 | 12 | 12 | 8 | 10 |
| Fluidity modifier | | | | | | | | | |
| $\alpha,\alpha'$-Dimethoxy-p-xylene | 6 | | | | | | | | 10 |

TABLE 1-continued

| | | | | | | | | | |
|---|---|---|---|---|---|---|---|---|---|
| p-Dimethoxybenzene | 8 | | | | | | | | |
| p-Xylylene glycol | | 10 | | | | | | | 6 |
| Diethylene glycol n-butyl ether | | | 5 | | | | | | 3 |
| Ethylene glycol di-n-butyl ether | | | | 3 | | | | | |
| Benzyl acetate | | | | | 8 | | | | |
| Dimethyl phthalate | | | | | | 12 | | | |
| Additive | | | | | | | | | |
| Furfural | | | | | | | | | |
| Styrene | | | | | | | | | |
| Wood flour | 80 | 80 | 80 | 80 | 80 | 80 | 80 | | |
| Glass fiber | | | | | | | | 115 | 115 |
| Other inorganic filler | 25 | 25 | 25 | 25 | 25 | 25 | 25 | 35 | 35 |
| Wax and other additive | 5 | 5 | 5 | 5 | 5 | 5 | 5 | 3 | 3 |
| Physical property | | | | | | | | | |
| Spiral flow length (cm) | 24 | 23 | 21 | 20 | 22 | 23 | 25 | 73 | 68 |
| Apparent curing rate at 110° C. (cm/sec) | 0.0060 | 0.0076 | 0.0071 | 0.0070 | 0.0071 | 0.0071 | 0.0069 | 0.0043 | 0.0051 |
| Apparent curing rate at 170° C. (cm/sec) | 0.75 | 0.86 | 0.73 | 0.72 | 0.70 | 0.87 | 0.83 | 0.70 | 0.72 |
| Apparent activation energy (Kcal/mol) | 29 | 28 | 26 | 26 | 26 | 27 | 27 | 29 | 28 |
| Thermal stability in cylinder (min) *b | 20 | 16 | 8 | 4 | 9 | 10 | 15 | 28 | 21 |
| Curing time (sec) | 70 | 80 | 80 | 80 | 80 | 80 | 80 | 50 | 65 |

| Example and Comparative Example | Ex.10 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| NOVOLAK #1000HS | | | | | | | |
| NOVOLAC #2000 | 100 | 100 | | 100 | 100 | 100 | 100 + 5 *a |
| MILEX XL-225 | | | 100 | | | | |
| Hexamethylenetetramine | 15 | 12 | 8 | 15 | 12 | 12 | 12 |
| Fluidity modifier | | | | | | | 6 *a |
| α,α'-Dimethoxy-p-xylene | 8 | | | | | | |
| p-Dimethoxybenzene | | | | | | | |
| p-Xylylene glycol | | | | | | | |
| Diethylene glycol n-butyl ether | | | | | | | |
| Ethylene glycol di-n-butyl ether | | | | | | | |
| Benzyl acetate | 7 | | | | | | |
| Dimethyl phthalate | | | | | | | |
| Additive | | | | | | | |
| Furfural | | | | | 10 | | |
| Styrene | | | | | | 10 | |
| Wood flour | | 80 | | | 80 | 80 | 80 |
| Glass fiber | 115 | | 115 | 115 | | | |
| Other inorganic filler | 35 | 25 | 35 | 35 | 25 | 25 | 25 |
| Wax and other additive | 3 | 5 | 3 | 3 | 5 | 5 | 5 |
| Physical property | | | | | | | |
| Spiral flow length (cm) | 39 | 14 | 18 | 16 | 15 | 15 | 19 |
| Apparent curing rate at 110° C. (cm/sec) | 0.0047 | 0.0077 | 0.0060 | 0.0090 | 0.0085 | 0.0081 | 0.0080 |
| Apparent curing rate at 170° C. (cm/sec) | 0.73 | 0.38 | 0.29 | 0.43 | 0.58 | 0.53 | 0.65 |
| Apparent activation energy (Kcal/mol) | 29 | 22 | 22 | 22 | 24 | 24 | 25 |
| Thermal stability in cylinder (min) *b | 33 | 1 | 2 | 2 | 2 | 3 | 3 |
| Curing time (sec) | 40 | 80 | 70 | 40 | 75 | 80 | 80 |

*a Subsequently added to the pre-cured phenolic resin compound
*b Maximum residence time in cylinder capable of filling mold within 15 sec.

What is claimed is:

1. A thermosetting resin composition for injection molding comprising a phenolic resin, hexamethylenetetramine, a filler, an additive and α,α'-dimethoxy-p-xylene, said resin composition having an observed curing rate of not less than 0.7 cm/sec at 170 ° C. and not more than 0.008 cm/sec at 110° C. wherein the observed curing rate is determined by the slope of the straight line portion indicating a significant change in the curing rate after the induction period on a disk cure chart showing a variation of fluidity index √S resulting from the change of primary holding time measured by a disk cure tester at a predescribed temperature; and having an observed activation energy of at least 26 Kcal/mol wherein the observed activation energy is calculated from the Arrhenius plot of the apparent curing rate.

2. A method for the preparation of a thermosetting resin composition for injection molding comprising adding α,α'-dimethoxy-p-xylene, to a phenolic resin, hexamethylenetetramine, a filler and an additive and precuring the resultant mixture by dry or wet kneading to obtain the thermosetting resin composition, said resin composition having an observed curing rate of not less than 0.7 cm/sec at 170° C. and not more than 0.008 cm/sec at 110° C. wherein the observed curing rate is determined by the slope of the straight line portion indicating a significant change in the curing rate after the induction period on a disk cure chart showing a variation of fluidity index √S resulting from the change of primary holding time measured by a disk cure tester at a prescribed temperature, and having an observed activation energy of at least 26 Kcal/mol wherein the observed activation energy is calculated from the Arrhenius plot of the apparent curing rate.

3. The resin composition of claim 1, wherein the composition contains from 8 to 25 parts by weight of hexamethylenetetramine, from 60 to 240 parts by weight of said filler, from 3 to 15 parts by weight of said additive and from 2 to 20 parts by weight of $\alpha,\alpha'$-dimethoxy-p-xylene per 100 parts by weight of phenolic resin.

4. The resin composition of claim 1, wherein said phenolic resin is selected from the group consisting of a novolac resin and a phenol aralkyl resin.

* * * * *

UNITED STATES PATENT AND TRADEMARK OFFICE
CERTIFICATE OF CORRECTION

PATENT NO. : 4,987,198

DATED : January 22, 1991

INVENTOR(S) : Izukawa et al.

It is certified that error appears in the above-identified patent and that said Letters Patent is hereby corrected as shown below:

Col. 7, claim 1, line 12, delete "predescribed" and insert therefor
--prescribed--.

Signed and Sealed this

Twenty-second Day of December, 1992

Attest:

DOUGLAS B. COMER

Attesting Officer

Acting Commissioner of Patents and Trademarks